US011371876B2

(12) United States Patent
Falk et al.

(10) Patent No.: US 11,371,876 B2
(45) Date of Patent: Jun. 28, 2022

(54) NEONATAL CARE SYSTEM WITH WEIGHT MEASUREMENT

(71) Applicant: GE Precision Healthcare LLC, Wauwatosa, WI (US)

(72) Inventors: Steven M. Falk, Laurel, MD (US); Sudeepa S. Aithala, Bangalore (IN)

(73) Assignee: GE Precision Healthcare LLC, Wauwatosa, WI (US)

( * ) Notice: Subject to any disclaimer, the term of this patent is extended or adjusted under 35 U.S.C. 154(b) by 124 days.

(21) Appl. No.: 16/895,237

(22) Filed: Jun. 8, 2020

(65) Prior Publication Data

US 2021/0333145 A1 Oct. 28, 2021

(30) Foreign Application Priority Data

Apr. 23, 2020 (IN) .............................. 202041017403

(51) Int. Cl.
G01G 19/44 (2006.01)
A61G 11/00 (2006.01)
G01G 19/50 (2006.01)

(52) U.S. Cl.
CPC ......... *G01G 19/445* (2013.01); *A61G 11/008* (2013.01); *G01G 19/50* (2013.01); *A61G 2203/44* (2013.01)

(58) Field of Classification Search
CPC .... G01G 19/44; G01G 19/445; G01G 23/002; G01G 23/015; A61G 11/008; A61G 2203/44
See application file for complete search history.

(56) References Cited

U.S. PATENT DOCUMENTS

| 4,038,973 | A | * | 8/1977 | Moore | A61B 5/1107 600/22 |
| 5,376,761 | A | * | 12/1994 | Koch | G01G 19/445 177/126 |
| 6,761,683 | B2 | * | 7/2004 | Gryn | A61G 11/00 5/603 |
| 8,599,025 | B2 | | 12/2013 | Cipriano | |
| 9,554,958 | B2 | * | 1/2017 | Richards | A61G 11/00 |
| 2002/0029911 | A1 | * | 3/2002 | Richards | G01G 19/445 177/144 |
| 2005/0268401 | A1 | * | 12/2005 | Dixon | A61G 7/008 5/655.3 |

(Continued)

FOREIGN PATENT DOCUMENTS

| EP | 2246675 | B1 | | 6/2014 | |
| KR | 20020063454 | A | * | 8/2002 | ........... G01G 23/002 |
| WO | 2003079953 | A2 | | 10/2003 | |

OTHER PUBLICATIONS

EP application 21168128.3 filed Apr. 13, 2021—Search Report dated Sep. 24, 2021; 6 pages.

*Primary Examiner* — Natalie Huls
(74) *Attorney, Agent, or Firm* — Andrus Intellectual Property Law, LLP

(57) ABSTRACT

A neonatal care system includes a platform for supporting an infant, at least one load cell configured to sense a weight of the infant supported on the platform, and an inclinometer configured to measure an angle of the platform. A controller is configured to determine an infant weight based on the sensed weight and the measured angle of the platform.

20 Claims, 4 Drawing Sheets

(56) References Cited

U.S. PATENT DOCUMENTS

| | | | |
|---|---|---|---|
| 2009/0306924 A1* | 12/2009 | Olmstead | G01G 19/4144 702/101 |
| 2012/0169501 A1* | 7/2012 | Cipriano | G01G 19/445 340/573.1 |
| 2013/0054173 A1* | 2/2013 | Panier | G01G 23/015 702/101 |
| 2014/0179984 A1* | 6/2014 | Cipriano | A61G 11/00 600/22 |
| 2015/0272802 A1* | 10/2015 | Tsitlik | A61G 11/002 600/301 |
| 2016/0069735 A1* | 3/2016 | Underwood | G01G 19/62 177/1 |
| 2019/0000704 A1 | 1/2019 | Kumar et al. | |
| 2020/0060907 A1 | 2/2020 | Childs | |

\* cited by examiner

NEONATAL CARE SYSTEM WITH WEIGHT MEASUREMENT

CROSS REFERENCE TO RELATED APPLICATIONS

The present application claims priority of Indian Patent Application Serial No. 202041017403, filed on Apr. 23, 2020, which is incorporated herein by reference in its entirety.

BACKGROUND

The present disclosure generally relates to neonatal care systems and methods, and more particularly to systems and methods for providing accurate and automated weight of a neonate.

Neonates, particularly premature infants, are often placed within an incubator so that they may have a controlled and monitored environment to aid in their survival and growth. It is necessary to monitor the infant's weight while the infant is maintained in the incubator. For example, medical therapies, such as the proper dosing of a medication, are based upon the accurate determination of the infant's weight.

Neonatal incubators, warmers, and other neonatal care systems may include integrated weighing systems comprising one or more load cells configured to determine a weight of an infant on a platform of the neonatal care system. Neonatal care systems providing infant weighing functionality typically require that the platform supporting the infant be manually leveled by a clinician prior to weighing the infant, such as by turning a control knob or crank to control mechanical tilting mechanisms under the platform. Current incubator and warmer systems typically include a level indicator, such as spirit level, on the platform and require that the clinician manually adjust the tilt of the platform until the level indicator shows that the platform is level.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, a neonatal care system includes a platform for supporting an infant, at least one load cell configured to sense a weight of the infant supported on the platform, and an inclinometer configured to measure an angle of the platform. A controller is configured to determine an infant weight based on the sensed weight and the measured angle of the platform.

In another embodiment, a neonatal care system includes a platform for supporting an infant, at least one load cell configured to sense a weight of the infant when supported on the platform, and an accelerometer configured to measure acceleration due to gravity at a measurement location. A controller is configured to determine an infant weight based on the sensed weight and the measured acceleration due to gravity at the measurement location.

A method of measuring infant weight includes sensing a weight of an infant on a platform in a neonatal care system, measuring an angle of the platform with an inclinometer, and determining an infant weight based on the sensed weight and the measured angle of the platform such that the infant weight is determined at any angle of the platform without requiring the platform to be leveled.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

Figure 1:
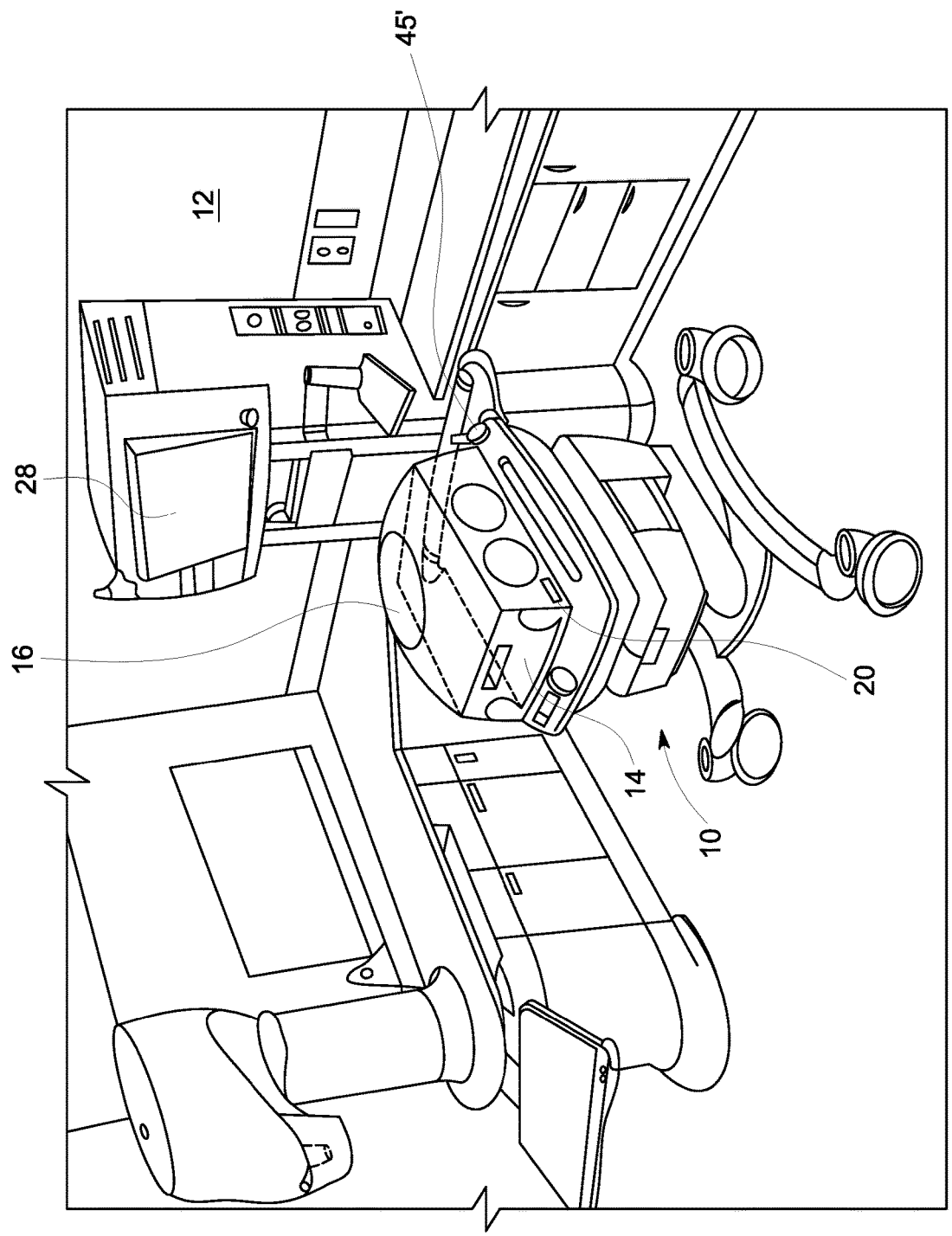
FIG. 1 depicts one embodiment of a neonatal care system.

The inventors have recognized that manual leveling process is time consuming and error prone. However, failure to accurately perform the manual leveling process can lead to erroneous weight measurements for the infant because the weighing systems are not designed to measure an infant on a tilted surface. Since infants, and particularly pre-term neonates, are small and their care is highly dependent on weight, accurate weight measurements are imperative. Moreover, clinicians caring for neonates deal with complicated work flows and thus erroneous weight measurements due to non-level platforms do occur and are problematic. Moreover, through their research and experience in the relevant field, the inventors have recognized that clinicians are burdened by having to perform the step of leveling the platform prior to weighing the infant, finding the manual leveling process to be time consuming and cumbersome.

Moreover, the inventors have also recognized that current neonatal weighing systems require location-specific weight calibrations that account for differences in gravitational effects at different locations around the globe. This adds complexity to the manufacturing process and introduces additional potential for error, as neonatal weighing devices are often calibrated for their intended eventual location at the place of manufacture. Thus, the inventors have recognized that neonatal weighing systems are needed that incorporate a gravity compensation means whereby no location-specific calibration is needed.

In view of the foregoing problems and challenges recognized by the inventors through their extensive research and experience in the field of neonatal care systems, the inventors have developed the disclosed improved systems and methods for weighing an infant housed in a neonatal incubator, warmer, or other neonatal care system. The disclosed systems and methods accurately weigh an infant regardless of an angle of the platform. In certain embodiments described herein, the neonatal care system is configured to determine the infant weight at any angle of the platform without requiring the platform to be leveled. In other embodiments, the neonatal care system includes a servomotor controllable to automatically level the platform prior to conducting the weight measurement.

Additionally, systems and methods disclosed herein provide infant weighing mechanisms incorporating gravity compensation mechanisms such that location-specific weight calibrations do not need to be performed. In certain embodiments, an accelerometer is incorporated into the neonatal care system and configured to measure acceleration due to gravity at the current location of the neonatal care system. That local acceleration measurement is then compared to a calibration gravity value stored at the location and time of last calibration. A gravity calibration ratio is calculated based on the current acceleration due to gravity (such as at the time of a weight measurement of an infant housed in the care system) and the calibration gravity value. The infant weight is then determined based on the gravity calibration ratio.

FIG. 1 illustrates one embodiment of a neonatal care system 10, which in the depicted example is a neonatal incubator. In other examples, the infant care system 10 may be a neonatal warmer, an incubator warmer, or similar. The neonatal care system 10 is located in a care area 12, such as a patient's room or a neonatal intensive care unit (NICU). The incubator-type neonatal care system 10 shown in FIG. 1 defines a microenvironment region 16 in which the neonatal patient rests and receives therapy, including heating and possible oxygen enrichment. The neonatal care system 10 includes a platform 14 for supporting an infant, and in some examples, a mattress 42 is located on the platform 14 (see FIG. 2). It is generally desirable that the neonate remain within the microenvironment 16 created by neonatal care system 10 such that the patient remains warm and is disturbed as infrequently as possible.

The platform 14 is configured to be tilted so as to optimally position the infant, such as on an incline, and a tilting mechanism 44 is configured to adjust and maintain an angle of the platform. In certain embodiments described herein, the tilting mechanism is a manually-controlled mechanical mechanism controlled by a knob 45', crank, or other mechanically-actuated user control. Such tilt control systems are standard in incubator and other neonatal care systems 10. In other embodiments, the tilting mechanism 44 may be a motorized system, such as comprising a servomotor 47 moving or actuating one or more mechanical arrangements connected to the platform 14 and configured to lift and lower the head and/or foot ends of the platform 14. For example, the motor 47 may be a brushed or brushless DC motor along with a gear system or a slider-crank mechanism to level the bed in a mechanized manner. In such an embodiment, the user input control 45 may be a push-button control or another type of input device allowing a user to dictate the angle of the platform. In certain embodiments, the user input control 45 from controlling the angle of the platform 14 may be incorporated into the user interface for the system 10, such as via a touch screen display 28.

A tilt measurement device 20, such as an inclinometer, is configured to measure a tilt angle of the platform 14. For example, the tilt measurement device 20 may be a digital inclinometer configured to measure a platform angle with respect to horizontal. To provide just one example, the digital inclinometer may be an integrated circuit, such as an ADIS16209 from Analog devices, which is an IC that works both as an inclinometer as well as an accelerometer and can communicate with controller 36. The angle received from this IC can be displayed on display 28 and the acceleration due to gravity can be used to compensate for the measured weight accordingly. The neonatal care system 10 may be configured to display the platform angle, such as on the display 28 such that it can be viewed by a caregiver.

Figure 2:
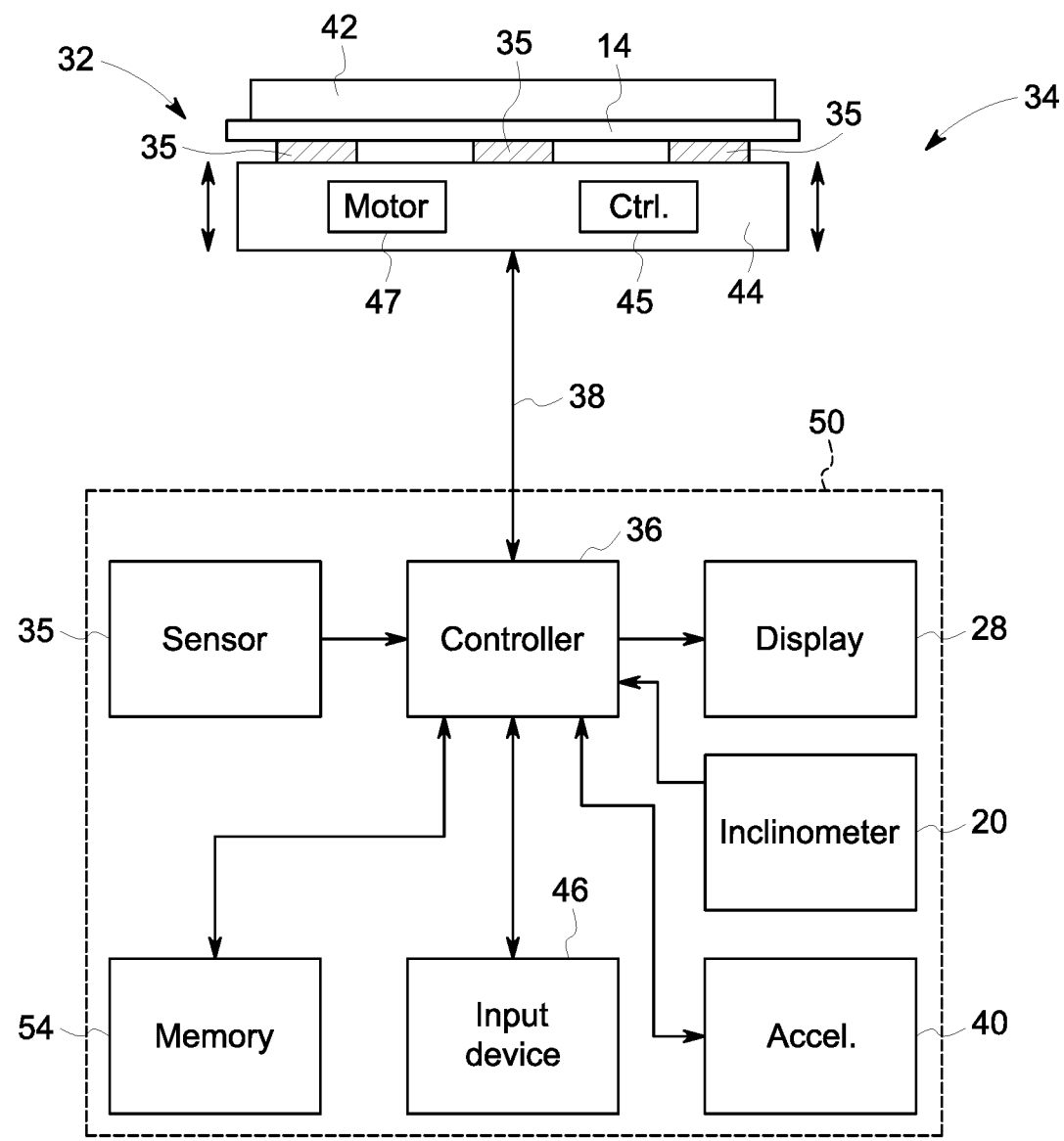
FIG. 2 is a schematic illustration of a weighing system in a neonatal care system in accordance with one embodiment of the present disclosure.

The incubator or other neonatal care system 10 includes a system for weighing the infant supported on the platform 14. FIG. 2 provides a schematic diagram of one embodiment of a weighing system 32 in accordance with the present disclosure. The weighing system 32 includes a scale that determines the weight of the infant and displays the weight on the display 28. The weighing system 32 may is positioned beneath the mattress 24 and/or platform 14. The weighing system 32 includes a scale 34 and a controller 36, which is preferably a microprocessor capable of running a processing routine. The controller 36 could be a separate processor from a controller of the infant care device or could be incorporated into the processor of the infant care device. The scale 34 is any conventional weighing device that is capable of outputting a signal via communication link 38 that is indicative of the weight of the objects placed thereon. In one embodiment, the scale 34 includes one or more load cells 35 that receive and measure load on the platform 14 and/or mattress 42. The load cell(s) 35 communicate with the controller via communication link 38, which may be via any wired or wireless connection protocols. In various embodiments, the scale 34 is configured as either a single or a multiple point load cell design that is accurate to within 0.01% of the load being weighed. Although the term load cell is used in the disclosure, it should be understood that the scale may incorporate any sensor(s) or device(s) that generate a numeric representation of weight or pressure.

The weighing system 32 also includes an input device 46 that communicates with the controller 36 for providing information to the controller, as discussed in detail below. The input device 46 may be incorporated into the housing 50 or may be a wireless input/output device used and remotely located from the housing 50 of the controller 36. In such an embodiment, the wireless input/output device 46 communicates through wireless communication systems and protocols such that the caregiver can enter information into the controller 36 from a location remote to the housing 50. The display 28 is associated with the controller 36 such that information from the controller 36 can be displayed and monitored by the caregiver in the location near the infant care device. Additionally, it is contemplated that the controller 36 could communicate with a remote location, such as a monitor at a nurses' station in the hospital or any other remote location. The data provided to the remote location from the controller 36 can be displayed in real-time, stored in a database, processed further, or any combination thereof. In this manner, a database of weight collected for the infant associated with the infant care system 10 can be analyzed and monitored from a remote location and instruction to perform a weight measurement may be inputted from a remote location.

The controller 36 is configured to automatically measure weight of the infant without clinician involvement to level the platform 14 supporting the infant. In certain embodiments, the controller 36 is configured to calculate a weight of the infant at any angle of the platform without requiring that the platform 14 be leveled prior. For instance, the controller 36 may be configured to calculate the infant weight as the sensed weight divided by cosine of the measured angle of the platform.

In another embodiment where the tilting mechanism 44 is motorized, the controller 36 may be configured to control a motor 47 of the tilting mechanism 44 to automatically level the platform 14 prior to conducting the weight measurement. Thus, the controller 36 is configured to automatically control the motor 47 based on the angle of the platform 14 measured by the inclinometer 20 to level the platform 14 prior to determining the infant weight. For example, the controller 36 may be configured to receive a user input device 46 from a clinician instructing a weight measurement. Upon receipt the clinician input, the controller 36 is configured to automatically level the platform with the motorized tilt mechanism 44 and then to weigh the infant. In certain embodiments, the controller 36 may be configured to, after conducting a reliable weight measurement, move the platform 14 back to the previous tilted position.

The system 10 may further include an accelerometer 40 configured to measure acceleration due to gravity at the current system location, and thus where the weight measurement is being conducted. As described above, small fluctuations in the influence of gravity at different locations around the world can impact infant weight. Furthermore, some jurisdictions have regulations in place requiring that weighing devices be calibrated for the measurement location. The inventors have recognized that an accelerometer can be utilized to measure the effect of gravity at a particular location and thus to calculate a calibration factor that can be utilized for easy and automated calibration for any location. Namely, the controller 36 may be configured to determine the infant weight based further on the measured acceleration due to gravity at the measurement location and to determine a gravity calibration ratio based on the acceleration due to gravity at the measurement location compared to acceleration due to gravity at a location where the scale 34 was last calibrated. For example, the controller 36 may be configured to store a calibration gravity value measured by the accelerometer 40 at a calibration location. For example, the calibration gravity value may be determined in a calibration process executed at the place of manufacture for the scale 34 or executed at the assembly location for the neonatal care device 10. The infant weight is then determined by multiplying the measured or calculated weight (e.g., if measured while the platform 14 is on an angle) by the gravity calibration ratio to account for any variation in the effect of gravity as compared to the calibration location that may impact the infant weight measurement.

Figure 3:
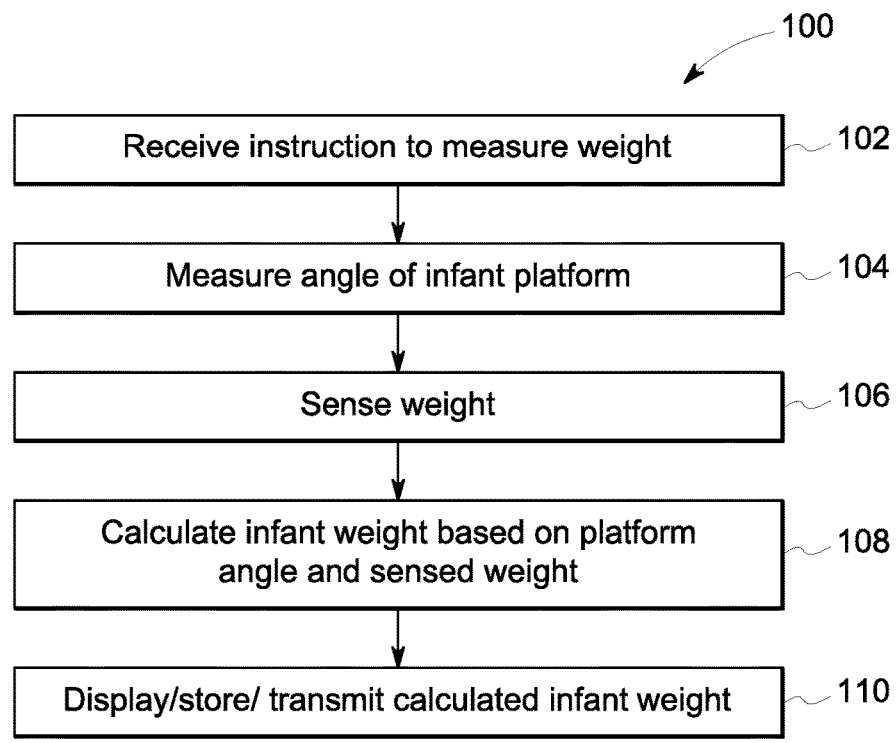
FIGS. 3-5 depict embodiments of methods of measuring infant weight in accordance with embodiments of the present disclosure.
Figure 4:
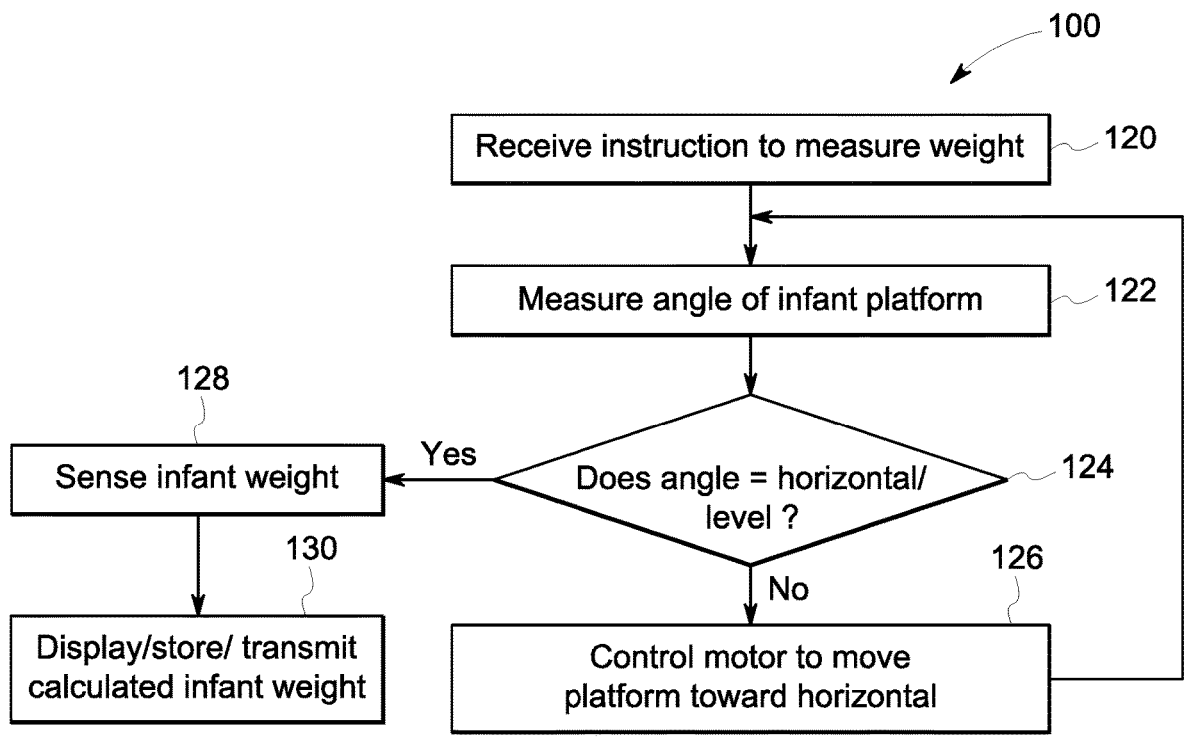
Figure 5:
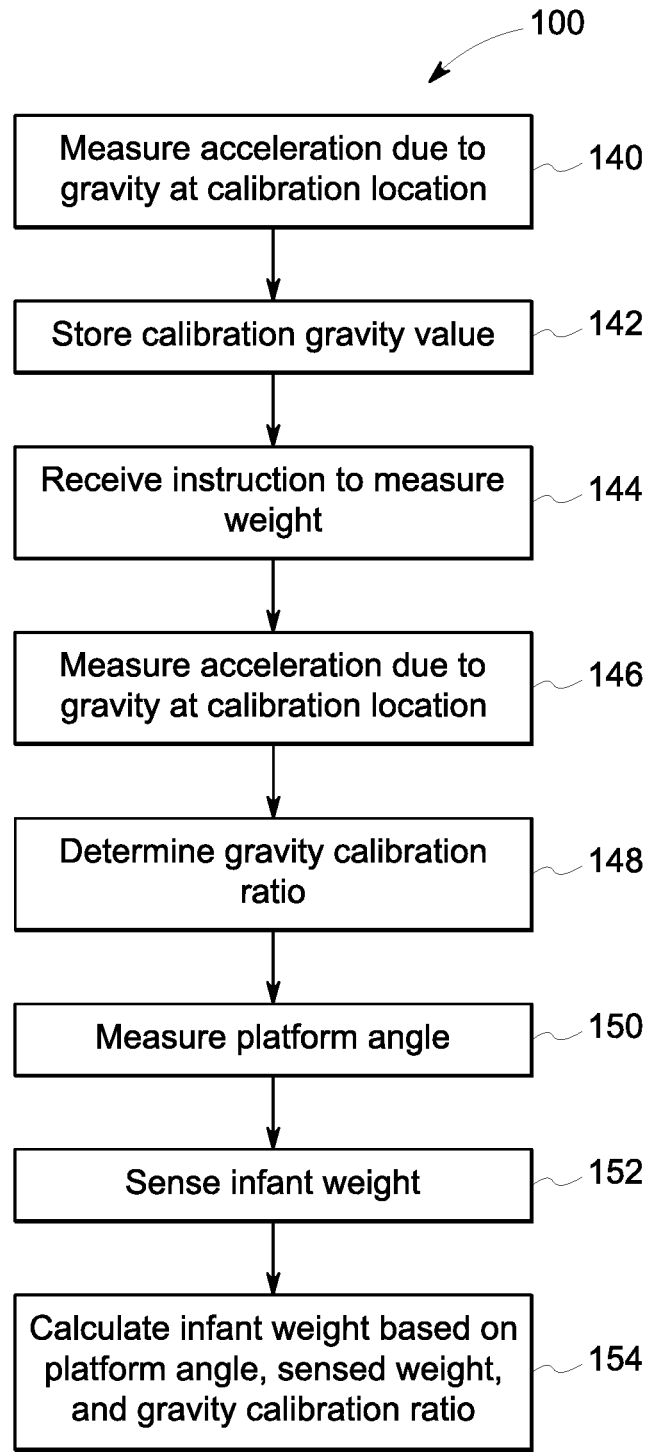

FIGS. 3-5 are flow charts depicting embodiments of methods 100 of measuring infant weight, or portions of such methods, in accordance with the present disclosure. FIG. 3 depicts a method 100 of measuring weight of an infant in which the infant weight is determined at any angle of the platform without requiring that platform to be leveled prior to weight measurement. The depicted steps are executed by a processing system, such as at controller 36 associated with the weighing system 32. An instruction to measure weight of the infant is received at step 102. The instruction may result from a user input commanding a weight measurement, such as via user input device 46. In other embodiments, the instruction may result from a periodic routine where the controller 36 is programmed to automatically and periodically conduct a weight measurement of the infant (e.g., every hour). The angle of the platform 14 is measured with the inclinometer 20 or other tilt measurement device configured to measure an angle of the platform 14 supporting the infant, as represented at step 104. The weight of the infant is sensed at step 106 via load sensor(s) 35. The infant weight is then calculated at step 108 based on the platform angle and the sensed weight. For example, the infant weight may be calculated by dividing the sensed weight by the cosine of the measured angle of the platform 14. The calculated infant weight is then displayed, stored, and/or transmitted at step 110. For example, the infant weight may be displayed on the display 28 so as to inform the clinician treating the infant. Alternatively or additionally, the calculated infant weight may be stored in the memory 54 of the weighing system 32 and/or in a memory associated with patient monitoring for the infant care device. Alternatively or additionally, the calculated infant weight may be transmitted, such as via wired or wireless means, to a central computing location such as a hospital network for storage in the patient's medical record and/or for remote access and monitoring of the infant housed in the neonatal care device 10.

FIG. 4 depicts a method 100 of measuring weight of an infant in which the neonatal care system 10 incorporates a motorized tilting mechanism 44 and the functionality of the weighing system 32 is coordinated with the motorized tilting mechanism 44 such that the platform 14 is automatically leveled prior to operating the scale 34 to measure the infant weight. Upon receipt of the instruction to measure the infant's weight at step 120, the controller 36 determines the angle of the platform 14 at step 122 based on input from the inclinometer 20. At step 124, the controller 36 then determines whether the platform is level, such as within a threshold range of horizontal. If the platform is not level then the controller 36 may control the motor 47 of the tilting mechanism 44 to move the platform 14 toward horizontal. The motor 47 may be continually controlled based on input from the inclinometer 20 until the platform reaches a level position, such as within a narrow threshold range of horizontal. Once the platform 14 is level, the controller determines the infant weight at step 128 based on the weight measured by the load sensor(s) 35, and then displays, stores, and/or transmits that value as described above, which is represented at step 130.

FIG. 5 depicts a method 100 of measuring weight of an infant in which the neonatal care system 10 incorporates an accelerometer configured to measure acceleration due to gravity, such as when the incubator or other neonatal care system 10 is not moving, and to perform automatic gravity compensation and calibration functionality. The acceleration due to gravity is measured at step 140, such as with accelerometer 40, taken at a calibration location. As discussed above, this may be any location of initial calibration of the scale 34, such as at the location of manufacture or assembly of the system 10. The value is stored at step 142 as a calibration gravity value. Upon receipt of the instruction to measure the infant's weight at step 144, the controller 36 then assesses accelerometer measurements at step 146 to determine gravitational effect at the current location where the weight measurement is being performed by the system 10. A gravity calibration ratio is then determined at step 148 comparing the current gravitational effect to that of the calibration location. Thus gravity calibration ratio is then utilized to compensate for any differences in gravitational effect between the calibration location and the measurement location.

The infant weight is then measured or calculated, such as by one of the two methods depicted in FIGS. 3 and 4. In the example at FIG. 5, the infant weight is calculated based on angle of the platform 14, and thus the platform angle is measured at step 150 and weight sensed at step 152, which is described in more detail above. The infant weight is then calculated using the gravity calibration ratio. For example, the infant weight determined based on the platform angle and sensed weight is multiplied by the gravity calibration ratio to arrive at the final weight for the infant. This final weight may then be displayed, stored, and or transmitted, as described above.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. A neonatal care system comprising:
a platform for supporting an infant;
at least one load cell configured to sense a weight of the infant supported on the platform;
an inclinometer configured to measure an angle of the platform;
a motor configured to control an angle of the platform;
a controller configured to:
control the motor based on the measured angle of the platform to level the platform prior to determining the infant weight; and
determine an infant weight based on the sensed weight and the measured angle of the platform.

2. The system of claim 1, wherein the controller is configured to determine the infant weight at any angle of the platform without requiring the platform to be leveled.

3. The system of claim 2, wherein the controller is configured to determine the infant weight as the sensed weight divided by cosine of the measured angle of the platform.

4. The system of claim 1, further comprising an accelerometer configured to measure acceleration due to gravity at a measurement location, and wherein the controller is configured to determine the infant weight based further on the measured acceleration due to gravity at the measurement location.

5. The system of claim 4, wherein the controller is further configured to store a calibration gravity value measured by the accelerometer at a calibration location and to determine the infant weight based further on the calibration gravity value.

6. The system of claim 5, wherein the controller is further configured to determine a gravity calibration ratio based on the measured acceleration due to gravity at the measurement location and the calibration gravity value, and wherein the controller is configured to determine the infant weight based on the gravity calibration ratio.

7. The system of claim 1, further comprising a user input device configured to receive a clinician instruction to determine infant weight, wherein the controller is configured to automatically control the motor to level the platform upon receiving the clinician instruction via the user input device.

8. The system of claim 1, further comprising at least one of an incubator or an infant warmer.

9. The system of claim 1, wherein the controller is configured to determine an infant weight based on the sensed weight and the measured angle of the platform by automatically determining the infant weight once the platform is level.

10. A neonatal care system comprising:
a platform for supporting an infant;
at least one load cell configured to sense a weight of the infant when supported on the platform;
an accelerometer configured to measure acceleration due to gravity at a measurement location;
a motor configured to control an angle of the platform;
a controller configured to:
control the motor based on a measured angle of the platform to level the platform prior to determining the infant weight; and
determine an infant weight based on the sensed weight and the measured acceleration due to gravity at the measurement location.

11. The system of claim 10, wherein the controller is further configured to store a calibration gravity value measured by the accelerometer at a calibration location and to determine the infant weight based further on the calibration gravity value.

12. The system of claim 11, wherein the controller is further configured to determine a gravity calibration ratio based on the measured acceleration due to gravity at the measurement location and the calibration gravity value, and wherein the controller is configured to determine the infant weight based on the gravity calibration ratio.

13. The system of claim 10, further comprising an inclinometer configured to measure an angle of the platform, and wherein the controller is configured to determine the infant weight based further on the measured angle of the platform.

14. The system of claim 13, wherein the controller is configured to determine the infant weight at any angle of the platform without requiring the platform to be leveled.

15. The system of claim 14, wherein the controller is configured to determine the infant weight at as the sensed weight divided by cosine of the measured angle of the platform.

16. The system of claim 10, further comprising at least one of an incubator or an infant warmer.

17. A method of measuring infant weight, the method comprising:
sensing a weight of an infant on a platform;
measuring an angle of the platform with an inclinometer;
controlling a motor based on the measured angle of the platform to level the platform; and
after the platform is level, determining an infant weight based on the sensed weight and the measured angle of the platform such that the infant weight is determined automatically once the platform is leveled.

18. The method of claim 17, further comprising measuring an acceleration due to gravity at a measurement location, and wherein the infant weight is determined based further on the measured acceleration due to gravity at the measurement location.

19. The method of claim 18, further comprising storing a calibration gravity value at a calibration location and determining a gravity calibration ratio based on the acceleration due to gravity at the measurement location and the calibration gravity value, wherein the infant weight is determined based further on the calibration gravity value.

20. The method of claim 17, further comprising receiving a clinician instruction to determine infant weight and then automatically controlling the motor to level the platform upon receiving the clinician instruction via the user input device.

* * * * *